US00RE36019E

United States Patent [19]

Stankus

[11] E Patent Number: Re. 36,019

[45] Reissued Date of Patent: Dec. 29, 1998

[54] ROOF CONTROL SYSTEM

[75] Inventor: John C. Stankus, Cannonsburg, Pa.

[73] Assignee: Jennmar Corporation, Pittsburgh, Pa.

[21] Appl. No.: 509,381

[22] Filed: Jul. 31, 1995

Related U.S. Patent Documents

Reissue of:

[64] Patent No.: 5,232,311
Issued: Aug. 3, 1993
Appl. No.: 703,162
Filed: May 20, 1991

[51] Int. Cl.[6] ..... E21D 20/02

[52] U.S. Cl. ..... 405/259.6; 405/259.4; 411/428; 411/534

[58] Field of Search ..... 405/259.1, 259.2, 405/259.3, 259.4, 259.5, 259.6; 411/9, 10, 11, 428, 531, 534, 908

[56] References Cited

U.S. PATENT DOCUMENTS

| | | | |
|---|---|---|---|
| 4,183,699 | 1/1980 | Donan, Jr. et al. | 405/259.3 |
| 4,195,952 | 4/1980 | Swanson | 405/259.3 |
| 4,206,060 | 6/1980 | Yamamoto et al. | 508/118 |
| 4,305,687 | 12/1981 | Parker | 405/259.3 |
| 4,400,113 | 8/1983 | Chaiko et al. | 405/259.6 |
| 4,619,559 | 10/1986 | Norris | 405/259.1 |
| 4,746,248 | 5/1988 | Lillis et al. | 405/259.5 |
| 4,984,938 | 1/1991 | Scott, Jr. et al. | 405/259.1 |
| 5,042,961 | 8/1991 | Scott et al. | 405/259.6 |

*Primary Examiner*—John A. Ricci
*Attorney, Agent, or Firm*—Webb Ziesenheim Bruening Logsdon Orkin & Hanson, P.C.

[57] ABSTRACT

A roof control system for underground strata has an elongated bolt adapted for insertion into a hole bored into the underground strata. The bolt is securely anchored in the hole at a location where a significant length of the bolt remains between the opening of the borehole and the anchor. A significant length of the bolt is placed in tension by rotating the bolt at a predetermined torque, with a plate mounted on the bolt and located adjacent to the outer surface of the strata and a nut on the end of the bolt for engaging the plate. The friction between adjacent surfaces which rub against each other when the bolt is rotated is selectively adjusted so that the tension/torque ratio of the bolt is selected to match the desired level for a particular type of strata. A array of friction reducing washers with different contact surface areas are provided so that one can be selected for location between the nut and plate.

13 Claims, 4 Drawing Sheets

ROOF CONTROL SYSTEM

Matter enclosed in heavy brackets [ ] appears in the original patent but forms no part of this reissue specification; matter printed in italics indicates the additions made by reissue.

INTRODUCTION

This invention relates to an improved roof control system for underground mines and, more particularly, to a system where load applied during installation of a roof bolt in a borehole is adjusted to provide a pre-selected and optimum tension/torque ratio of the bolt for rock in the particular strata that happens to surround the borehole in which the bolt is installed. This allows an "Optimum Beaming Effect" (OBE) to be achieved by an array of bolts for supporting a mine roof under a given set of conditions.

BACKGROUND OF THE INVENTION

For many years roof bolts have been used for supporting rock strata above the roofs in underground mines. Roof bolts are typically formed of elongated rods of steel anchored in boreholes by (1) various types of mechanical shells or (2) resin which extends along all or part of the length of the bolt. More recently, bolts which are both mechanically anchored in the borehole and reinforced by resin have proved advantageous by preventing loss of tension (e.g., bleed-off) in the bolt over time which had previously been caused by deterioration of surrounding strata, creep, improper hole size or bolt damage during installation.

Within the past 10 years, significant advances in bolt technology have contributed to faster installation speeds, greater anchoring effectiveness, and more favorable economics in the use of roof bolts. One example is a roof bolt such as the one known as the INSTAL bolt made by Jennmar Corporation which operates to mix a two-part resin and then tension the bolt by continuous rotation in a single direction immediately after the bolt is inserted into the borehole. See, for example, U.S. Pat. Nos. 4,413,930 and 4,419,805. Another advance was the use of an effective compression ring for compacting resin into a solid, void-free column which surrounds and extends below an expansion shell which provides better anchorage with less resin. See U.S. Pat. No. 4,865,489.

Another advance was a technique for reducing internal friction between various component parts of a roof bolt, for example, a low friction washer formed of plastic or lubricated components, located between the bearing plate, which is adjacent to the mine roof, and the hardened washer which is positioned adjacent to the forged head on a roof bolt.

These latter devices are particularly effective in reducing internal friction and frictional torque loss during bolt installation since the interface between the bearing plate and hardened washer is believed to be the greatest single source of internal friction in a roof bolt. Other developments include adjusting angles and the surface areas between the camming plug portion of an expansion shell and the adjacent expansion fingers and to provide low friction materials between those adjacent surfaces.

Such efforts to reduce internal friction are known to increase the tension/torque ratio from about 50:1 in a bolt where the hardened steel washer engages the bearing plate, to as high as 120:1. While the installed load of a roof bolt is generally not recommended to exceed 70 percent of the yield strength of the bolt material, higher tension/torque ratios can be obtained by upgrading bolt specifications.

Although the reduction of internal friction in various components of a roof bolt was generally considered advantageous, the effect of increasing the installed load and consequentially the tension/torque ratio for various types of roof strata was not understood.

SUMMARY OF THE PRESENT INVENTION

The invention is directed to providing a bolt system where the installed load and consequently the tension/torque ratio of a roof bolt is pre-selected and adjusted to provide maximum performance for a particular rock strata. After the rock strata is analyzed and its mechanical properties determined, a generally acceptable tension/torque ratio is pre-selected, being known from experience. For example, where there is a weak, thinly laminated strata, a higher tension/torque ratio is preferred, as opposed to a more competent strata with a high percentage of coarse or fine grained sandstone where a lower tension/torque ratio provides more desirable results.

Since different types of roof bolts have internal frictional characteristics depending on size, configuration, and materials from which the various components are formed, tests are conducted to determine the tension/torque ratio for a particular bolt under various conditions depending on the bolts specified by a particular mine. After tests determine the tension/torque ratio for these bolts, the installed load is adjusted by, for example, varying the internal frictional characteristics of the component parts. A preferred way of varying the frictional interplay is by providing a selection of plastic washers with varying volumes or displacements, preferably formed of polyethylene, which can be placed between the bearing plate of the bolt and the normally hardened steel washer located above the forged head. By providing a plurality of such washers with different displacements, the frictional losses can be pre-selected and adjusted to optimize the installed load of the bolt and consequently the tension/torque ratio.

In this way, the bolt can be custom designed for a particular rock strata for a maximum performance.

BRIEF DESCRIPTION OF THE DRAWINGS

For a better understanding of the invention, reference should be made to the detailed description of explanatory embodiments set forth below, considered in conjunction with the accompanying drawings which include.

DETAILED DESCRIPTION OF THE PREFERRED EMBODIMENT

Figure 1:
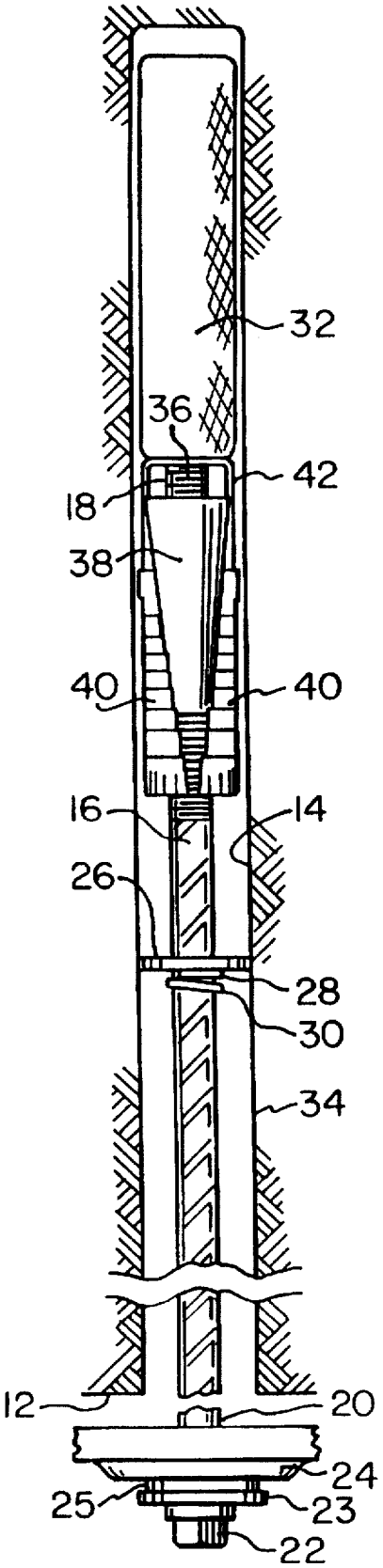
FIG. 1 is a plan view of a mine roof bolt with a bail-type shell which can be used with the present invention.

FIG. 1 shows a mine roof bolt of the type to which the present invention can be applied. The bolt is formed of an elongated length of steel rod 16 which can either be smooth on its outer surface or with projections as shown which are typical of using lengths of rebar or J-bar for the rod 16. A head 22 is forged on one end of the rod, with the other end (the end which is inserted into the borehole) being formed with threads 18. An expansion shell, which in this case is formed of a camming plug 38, expansion fingers 40 and a bail 42 for holding the plug and fingers on the threads 18, is mounted on the threads 18 as shown.

An adjustable resin compression ring 26 is mounted on an adjustable wire clamp 28 which ears 30 on the rod 16 for compacting resin in a resin cartridge 32, which is inserted into a borehole 14 drilled in surrounding rock strata 34, prior to insertion of the boll as described in greater detail below. The bolt shown in FIG. 1 also includes a bearing plate 24 which is positioned adjacent to the mine roof 12. A hardened steel washer 23 is typically located between the bearing plate and the forged head 22. As shown, a low-friction washer 25, discussed in detail below, is located between the steel washer 23 and beating plate 24.

Another type of bolt 48 which can be used with the invention is shown in FIGS. 24, where a standard shell 54 formed with expansion fingers 52 and a camming plug 50 with a shear pin 58, is mounted on the bolt threads above a support nut 56, as described in greater detail in U.S. Pat. Nos. 4,413,930 and 4,419,805 mentioned above. Instead of using the clamp for holding the compression ring 26 in place, a rubberlike washer 48 is used.

Figure 2:
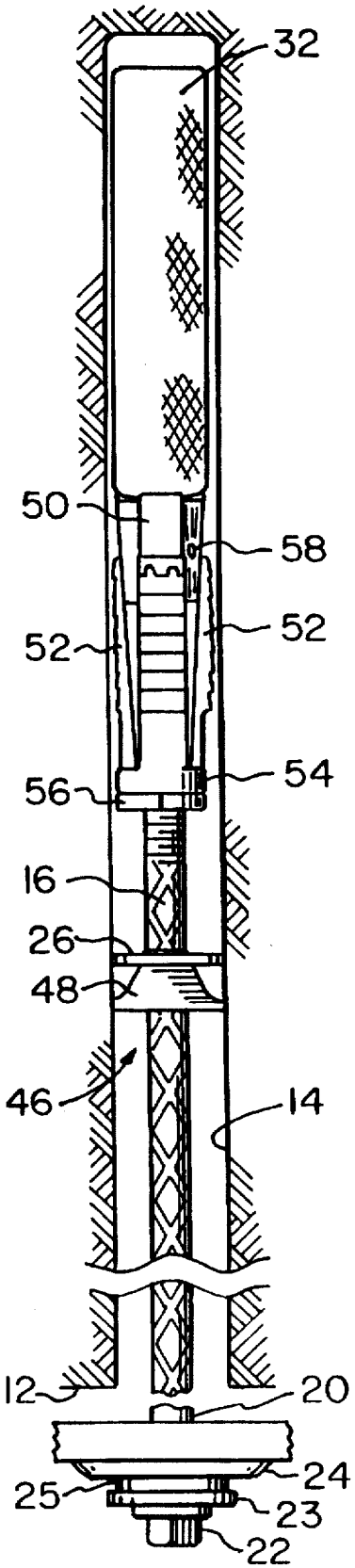
FIGS. 2–4 are schematic views of a bolt similar to the bolt of FIG. 1, but with a conventional expansion shell with a support nut instead of a bail-type shell, being installed.
Figure 3:
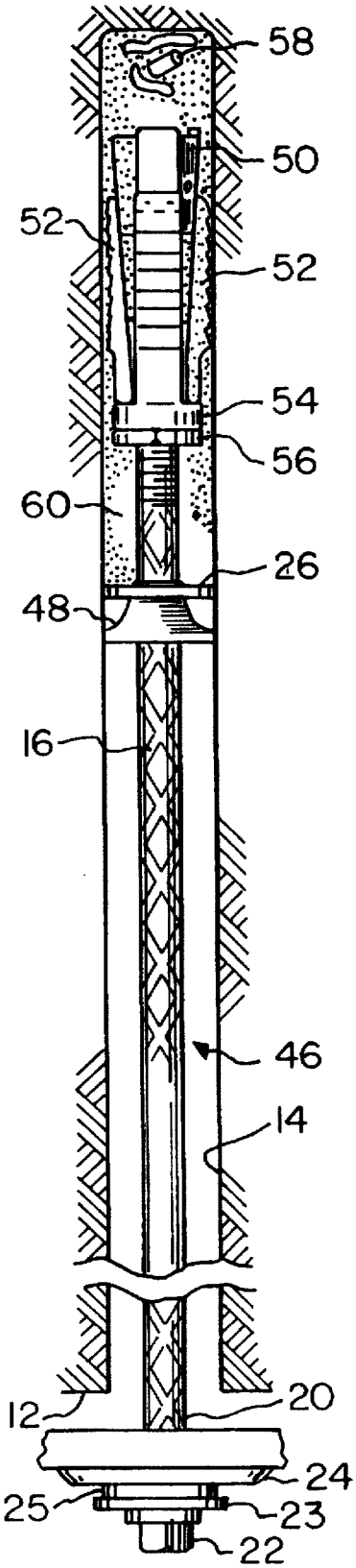

In a typical installation of the bolts described, a cartridge of two-component resin is inserted into the borehole, which is then followed by the bolt as shown in FIGS. 1 and 2. The bolt is then pushed upwardly into the borehole as shown in FIG. 3 which causes the upper end of the bolt and shell assembly to puncture the resin cartridge and travel through it to a position several inches away from the end of the borehole. The bolt is then rotated by a bolting machine which engages the forged head 14 and operates to rotate the expansion shell, camming plug and support nut to mix the resin.

The camming plug can be formed with a shear pin, as shown in U.S. Pat. Nos. 4,413,930 and 4,419,805, which maintains the plug fixed relative to the rotating bolt until the resin hardens enough to cause sufficient drag on the shell assembly so that advancement of the bolt breaks the shear pin and causes it to move along the threads. When the support nut reaches the end of the threads, the camming plug is caused to move downwardly along the expansion fingers to expand them for anchoring the bolt into adjacent rock.

In another embodiment of the invention, the camming plug does not include a shear pin. The internal frictional forces between adjacent surfaces of the shell assembly and the threads on the bolt provide frictional interaction which causes the shell assembly to rotate with the bolt and mix the resin before the expansion shell expands into contact with the borehole wall.

Figure 4:
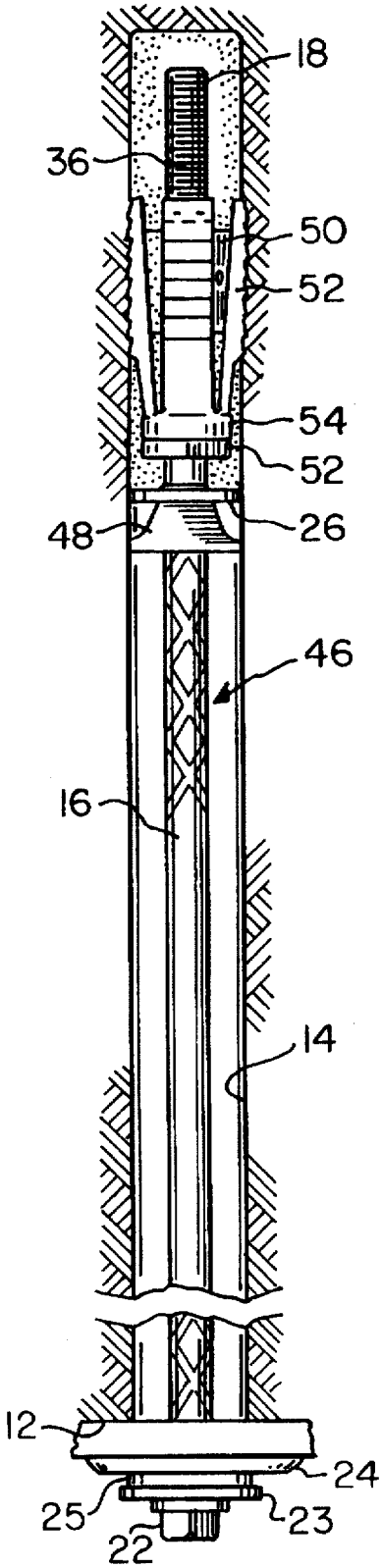

Once the shell assembly has been expanded into engagement with the walls of the borehole, as shown in FIG. 4, continued rotation of the bolt relative to the camming plug creates a tension in the bolt. The bolt is rotated and advanced until the bolting machine reaches a predetermined load limit and stalls out, at which time installation is complete.

During installation of the bolt, the bolting machine applies a turning force to the bolt. The amount of load actually translated to the rock strata by the expansion fingers through the bolt is significantly less than the load applied directly to the bolt because of internal frictional losses due to engagement of adjacent surfaces of the bolt. These surfaces include the interfaces between the forged head 22 and the hardened steel washer 23, the washer 23 and the bearing plate 24, the inner surfaces of the expansion assembly, and the expansion assembly and the threads on the end of the rod. Because the surface area between the hardened steel washer 23 and the bearing plate 24 is greater than any of the other adjacent surface areas, it absorbs much of the thrust of the bolter. It has been determined that this interface experiences the greatest frictional loss in the bolting system.

Over the years, bolts such as the one shown in FIGS. 1 and 2 have been used in mine roof control plans with little regard to the effect that an installed load might have on the effectiveness of the roof bolt. It has also been determined that various types of roof bolts work better under certain conditions such as, for example, that resin anchored bolts without mechanical shells work better in wet conditions with what is known as a "bad roof," while mechanical bolts with or without resin work better with dry, more stable roof conditions. Accepted procedures have been developed for the spacing and configuration of roof bolts in a mine to provide maximum benefit for the roof bolts under various conditions.

The ratio between the tension placed on a bolt and the torque applied by the bolting machine is measurable. It has been determined that for a typical hardened steel washer there is generally a tension/torque ratio of about 50:1. Recent developments such as the use of a low-friction washer between the bearing plate and hardened steel washer are known to increase the tension/torque ratio because the washer allows an increase of installed load through the reduction of friction between these two adjacent surfaces.

In accordance with the invention, it was determined that installed load and consequently the tension/torque ratio can effect the performance of a roof bolt under certain roof conditions. For example, where there is a weak, thinly laminated strata, a higher tension/torque ratio is preferred because where there is a higher installed load applied quickly through the strata, increased frictional resistance along the bedding planes of the rock would make them more resistant to lateral movement. On the other hand, where there is more competent strata such as, for example, a high percentage of coarse or fine grained sandstone, optimum anchorage is obtained with a lower installed load and tension/torque ratio.

In accordance with the invention, a series of different sized anti-friction washers have been developed in order to accommodate varying types of strata and customize roof bolts to a particular roof condition. It has been determined that most mine roof conditions can be accommodated through five different sizes of washers formed of polyethylene (called numbers 1–5, respectively). The outer diameter, inner diameter and thickness of these washers are (1) 1.75"×0.82"×0.10"; (2) 1.625"×0.82"×0.125"; (3) 1.650"×1.020"×0.160"; (4) 2"×1.175"×0.160" and (5) 2.5"×1.5"×0.1875". These same number designations are used below when referring to the washers.

The smaller washers reduce friction less than the larger washers because of the lesser volume and surface area of the smaller washers between the bearing plate and hardened steel washer of the bolt, as shown in FIGS. 1–4, where a polyethylene washer 25 is located between the hardened steel washer 23 and roof plate 24.

In order to adapt these washers to particular roof bolts and particular strata in the mine, the following procedure is used. First, the strata of the mine must be examined to determine the characteristics of the rock. Factors which must be considered are:

1. Overburden depth.
2. Strata composition.
3. Fineness and number of laminations.

4. Number of changes in the type of rock comprised in the laminations.

5. Rock physical properties—compressive strength, Young's modulus, Poisson's ration, density, moisture content, etc.

From these data, an understanding of the rock strata can be obtained to determine a general range of tension/torque ratios along with the generally accepted type of bolt for that particular strata. Next, tests are conducted at various locations in the mine with a bolt selected for use to determine the anchorage capacity and tension/torque ratio and whether it generally matches the rock strata at the mine. The tension/torque ratio is then adjusted by testing various ones of the low-friction washers mentioned above and measuring installed load by using a load cell on the bolt in a known procedure.

The optimum anti-friction washer for a particular roof condition is one where pull tests determine the lowest deflection or lengthening of the bolt when pulled to the yield strength of the bolt material after the bolt has been installed. It has been found that the greater the installed load, the lesser the deflection under a given set of conditions. However, once a minimum deflection is determined then the tension/torque ratio should be adjusted for the particular rock condition.

By matching the tension/torque ratio to the strata, what is called the "Optimum Beaming Effect (OBE) can be achieved. What this means, is that given a particular type of strata, by proper bolt spacing and installed load on the bolt, the summation of the resultant upward compressive forces can in effect produce a beaming effect that could support any amount of strata, at any depth.

For the roof to begin to fail, the vertical downward pressure would have to exceed the summation of the upward forces created by the installed load for each roof bolt. This information can be obtained through the use of a stratascope to examine the inside of boreholes drilled at various locations in the mine and from core drilling data that most mines have available.

Figure 5:
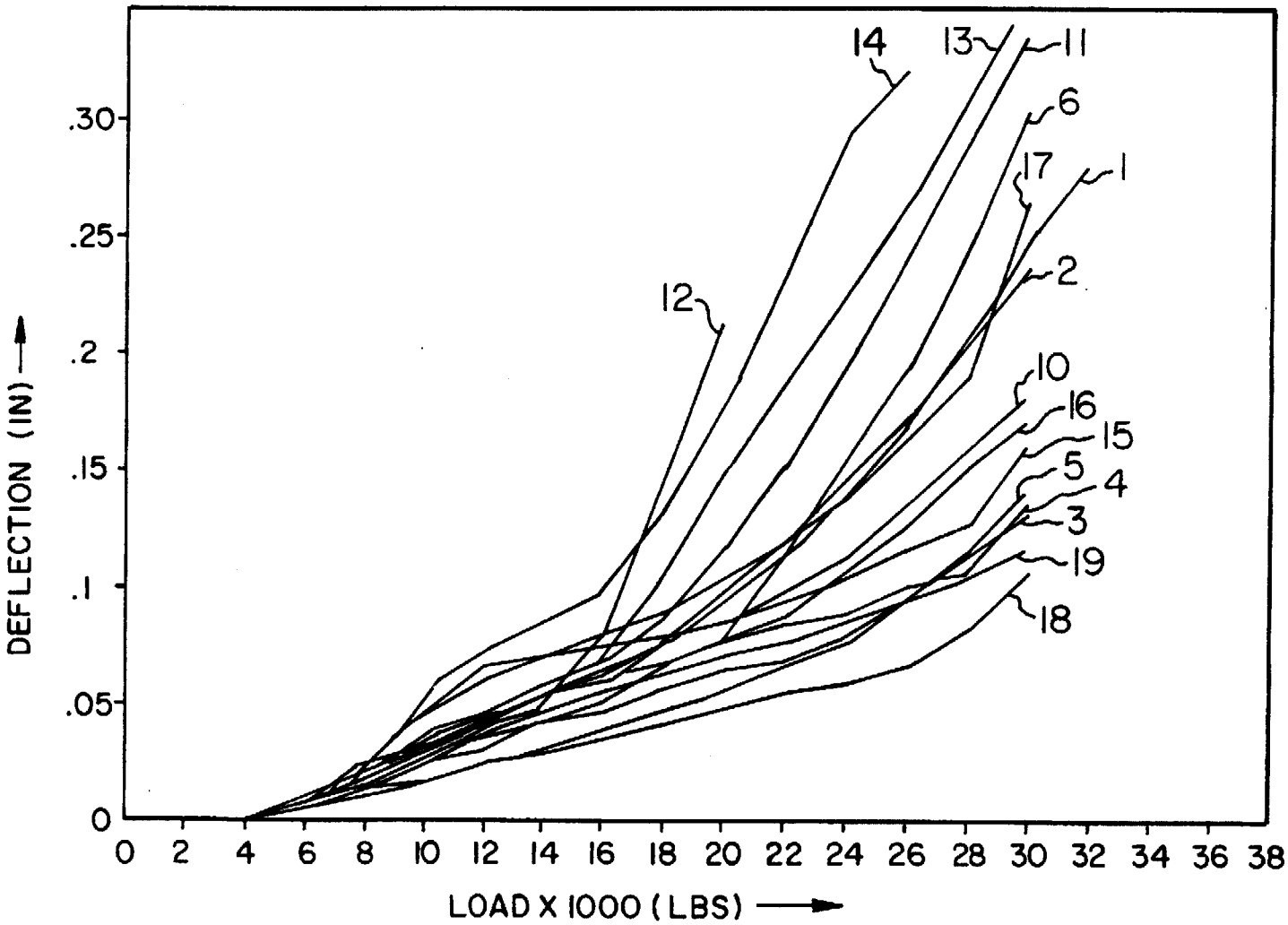
FIG. 5 is a chart showing the deflection of elongation of bolts installed with different low-friction washers.

The effect of different sized anti-friction washers is shown in the chart of FIG. 5, where the "Y" axis shows the deflection in inches of 19 different bolts installed with various sized low-friction washers, the "X" axis showing the pull exerted on the bolts. Deflection is the distance the bolt is stretched or elongated as it was pulled up to the yield strength of the steel used in the bolt. FIG. 5 shows that under the same conditions and in a number of tests where the same bolt was used, which was a bail-type shell known as the Jennmar J3BM, different deflections resulted from tension/torque ratios adjusted by using different low-friction washers. For example, for tests 1, 2, 10, 11, 14, 15, 16, 17 and 18, a number 1 low-friction washer was used, and in tests 3 and 4 a number 2, tests 5 and 6 a number 3, tests 12 and 13 a number 4, and test 19 is a test showing no resin used with the bolt.

These tests illustrate the respective deflections caused by the different tension/torque ratios resulting from the use of low-friction washers of various sizes, with the tests with a number 2 washer showing the greatest consistency in producing a relatively low deflection. A higher tension/torque ratio consequently produces a higher amount of installed load of initial bolt tension. During a pull test, bolt head deflection readings are lower on bolts with high installed loads. The installed load must be exceeded by the applied load before large deflections can occur. In mine roof control, this fact is very important. Before the roof can begin to fail, the installed load of the roof bolt would also have to be exceeded by the vertical downward load applied by the roof.

Figure 6:
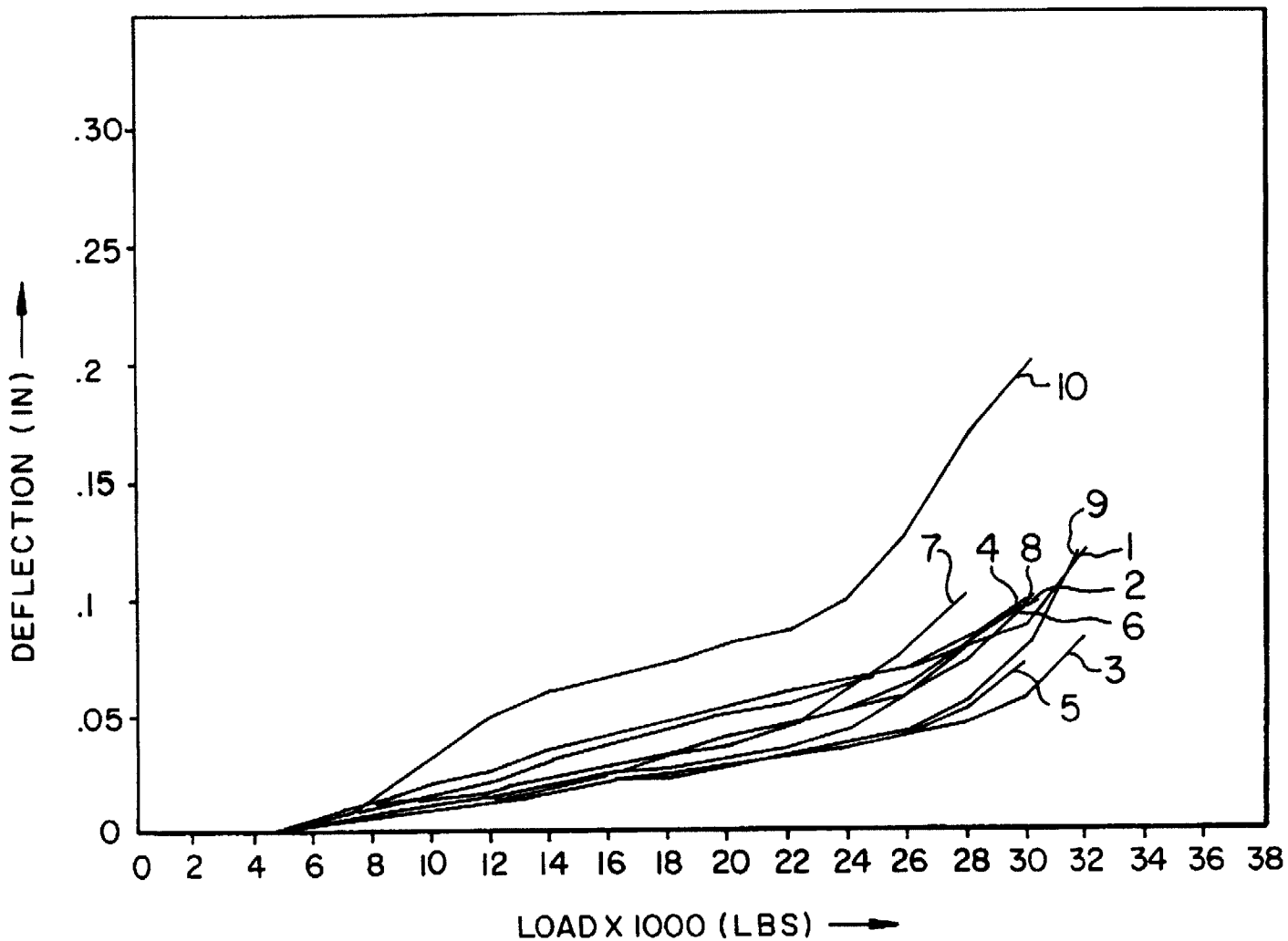
FIG. 6 is a chart showing the deflection of elongation of bolts using an optimum low-friction washer under a given set of conditions.

In the chart shown in FIG. 6, ten pull tests were conducted with the same J3BM shell mentioned above with a low-friction washer matched to the strata for the mine where the tests in FIG. 5 were conducted, which was a number 2 polyethylene washer. This washer was determined to be the proper sized one for the strata involved which was thinly laminated, weak shale with a low percentage of sandstone or sandy shale. This result was determined because under these conditions and for the bolt selected there was a relatively low deflection with relatively consistent results.

Thus, in accordance with the invention, it has been determined that by adjusting the size of low-friction washer located between the bearing plate and hardened steel washer, the installed load and consequently the tension/torque ratio can be adjusted to optimize the bolt to particular roof conditions. It should be understood that the importance of an anti-friction washer is to reduce internal friction in the bolt and that other friction-reducing members can be used, such as, for example, a plastic sheet located between the surface of the camming plug and expansion fingers, and lubricating or otherwise making smoother adjacent surfaces. The invention contemplates reducing internal friction to optimize bolt performance and is not limited to use of an anti-friction washer for accomplishing these results.

It should also be understood that the invention can be improved or modified and still incorporate the primary features of the invention, which are set forth in the appended claims:

I claim:

1. Roof control system for underground strata, comprising:

a) an elongated bolt adapted for insertion into a hole bored in underground strata;

b) [anchor means] *an anchor assembly* for securely anchoring the bolt in the hole at a location where a significant length of the bolt remains between the opening of the borehole and the anchor [means] *assembly*;

c) tension means for placing said significant length of said bolt in tension by rotating the bolt at a predetermined torque, [torque] the *tension* means including a plate mounted on the bolt and located adjacent to the outer surface of the strata, and a nut [means] on the end of the bolt for engaging the plate;

d) tension/torque adjustment means for selectively adjusting friction between adjacent surfaces which rub against each other when the bolt is rotated, whereby the tension/torque ratio of the bolt is selected to match the desired level for a particular type of underground strata, the tension/torque adjustment means including *a friction reducing washer selected from* an array of friction reducing washers with different contact surface areas, for location between the nut [means] and plate.

2. The system of claim 1, wherein the bolt includes a length of steel rebar or J-bar.

3. The system of claim 2, wherein the anchor [means] *assembly* includes an expansion shell with a bail strap for holding the shell on the bolt.

4. The system of claim 2, wherein the expansion shell includes a support nut for holding the shell in the bolt.

5. The system of claim 1, wherein the anchor [means] *assembly* includes an expansion shell maintained on the innermost end of the bolt relative to the hole, means for expanding the shell into contact with the walls of the borehole upon rotation of the bolt, and a two-component resin which is mixed upon rotation of the bolt.

6. The system of claim 1, [wherein] *with* the nut [means includes a nut] formed on the end of the bolt and a steel washer adjacent to the nut, whereby the tension/torque adjustment means adjusts friction between the washer and plate.

7. A method of mine control for underground strata, comprising:

a) placing an elongated bolt into a hole bored in underground strata;

b) securely anchoring the bolt in the hole *by an anchor assembly* at a location where a significant length of the bolt remains between the opening of the borehole and the [anchor means] anchor *assembly*;

c) placing said significant length of said bolt in tension by rotating the bolt at a predetermined torque, wherein a plate is mounted on the bolt and located adjacent to the outer surface of the strata and a nut [means] is on the end of the bolt that engages the plate;

d) selectively adjusting the friction between adjacent surfaces which rub against each other when the bolt is rotated for adjusting the tension/torque ratio of the bolt to match the desired level for a particular type of underground strata, including selecting *a friction reducing washer* from an array of friction reducing washers with different contact surface areas and volumes of washer material and placing [one of said washers] *the selected friction reducing washer* between the nut [means] and plate prior to rotating the bolt.

8. The method of claim 7, wherein in step "a" the bolt includes a length of steel rebar or J-bar.

9. The method of claim 7, wherein in step "b" the anchor *assembly includes* an expansion shell [is] maintained on the innermost end of the bolt relative to the hole and there is further provided the steps of expanding the shell into contact with the walls of the borehole upon rotation of the bolt, and mixing a two component resin upon [rotating] *rotation* of the bolt.

10. The method of claim 9, wherein the expansion shell is a bail-type shell.

11. The method of claim 10, wherein the expansion shell is an expansion shell held in place by a support nut.

*12. The system of claim 1, wherein the selected friction reducing washer is the friction reducing washer which best matches a desired tension/torque ratio to the strata to obtain an optimum beaming effect.*

*13. The method of claim 7, further including the steps of selecting the friction reducing washer by:*

*using a test bolt at various mine roof locations to determine a desired tension/torque ratio;*

*testing various friction reducing washers from the array with the test bolt and measuring installed load on the test bolt; and*

*selecting an optimum friction reducing washer from the array, wherein the optimum friction reducing washer is that washer for which pull tests determine the lowest deflection or lengthening of the test bolt to have occurred.*

* * * * *